(12) United States Patent
Zhuang et al.

(10) Patent No.: US 7,739,528 B2
(45) Date of Patent: Jun. 15, 2010

(54) METHOD FOR MANAGING AND CONTROLLING THE LOW POWER MODES FOR AN INTEGRATED CIRCUIT DEVICE

(75) Inventors: Zhiqing Zhuang, Irvine, CA (US); Jalil Fadavi-Ardekani, Newport Coast, CA (US); Soheyla Kamal, legal representative, Newport Coast, CA (US); Vinay Kumar Bhasin, Irvine, CA (US); Lawrence John Madar, III, San Francisco, CA (US); Chenmin Zhang, Irvine, CA (US); Vafa James Rakshani, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 849 days.

(21) Appl. No.: 11/495,745

(22) Filed: Jul. 31, 2006

(65) Prior Publication Data

US 2007/0288778 A1 Dec. 13, 2007

Related U.S. Application Data

(60) Provisional application No. 60/804,342, filed on Jun. 9, 2006.

(51) Int. Cl.
*G06F 1/26* (2006.01)
*G06F 1/32* (2006.01)

(52) U.S. Cl. .................................... 713/320
(58) Field of Classification Search ................. 710/260
See application file for complete search history.

(56) References Cited

U.S. PATENT DOCUMENTS 5,586,308 A * 12/1996 Hawkins et al. ............. 713/501
5,657,444 A * 8/1997 Hall et al. ..................... 726/26
5,878,264 A * 3/1999 Ebrahim ..................... 713/323
5,987,244 A * 11/1999 Kau et al. ................... 713/500
6,526,514 B1 * 2/2003 Nguyen et al. .............. 713/300
6,665,802 B1 * 12/2003 Ober .......................... 713/320
6,674,821 B1 * 1/2004 Mejyr ........................ 375/354
6,990,594 B2 * 1/2006 Kim .......................... 713/322
7,089,338 B1 * 8/2006 Wooten et al. .............. 710/110
2006/0097753 A1 * 5/2006 Shibata et al. ................ 326/83

OTHER PUBLICATIONS

The I2C-bus and how to use it (including specifications), 1995, Philip Semiconductor pp. 1-24.*

* cited by examiner

*Primary Examiner*—Thomas Lee
*Assistant Examiner*—Brandon Kinsey
(74) *Attorney, Agent, or Firm*—Sterne, Kessler, Goldstein & Fox P.L.L.C.

(57) ABSTRACT

A state machine and an external interface, including its associated input-outputs (IOs), are always powered on and used to manage the chip power modes and power mode transitions. The chip power modes are defined as RUN, HIBERNATE, POWERDOWN, with many more possible with this invention. For example, once the device is in HIBERNATE or POWERDOWN modes, the power supplies to the IC are either reduced, or completely disconnected except for this controller state machine. This invention's state machine and control mechanism, in response to some external "wake up event", will bring the chip to RUN mode by managing the state of the external power supplies through its control interface. The implementation achieves small die size and extreme low power consumption.

28 Claims, 4 Drawing Sheets

METHOD FOR MANAGING AND CONTROLLING THE LOW POWER MODES FOR AN INTEGRATED CIRCUIT DEVICE

CROSS REFERENCE TO RELATED APPLICATIONS

This application claims priority to U.S. Provisional Application No. 60/804,342, filed on Jun. 9, 2006, which is incorporated herein by reference in its entirety.

BACKGROUND OF THE INVENTION

1. Field of the Invention

The present invention is directed to managing low power modes in Integrated Circuits (ICs), and more particularly to providing a self-contained power management unit having intelligence and programmability separate from the main data processor for mobile multimedia devices.

2. Background Art

As more and more computing and multimedia facilities become available on mobile devices, there is an increasing need for a longer continuous operation of these devices without frequent charging of the battery. Another motivation for conserving the battery power is the increase of mobile applications, especially for business purposes where the devices in use are either away from a battery recharge source or there isn't enough time to recharge frequently. As a result, power consumption issues may limit the usability and performance of such mobile devices. Design techniques aimed at improving performance may therefore fall short if power management is not considered. To the same goal, power management units have been designed which operate at the low voltage ranges needed for these mobile devices to operate.

Present day devices have more and more features concomitant with the applications they are designed for. For example, the simple feature of alerting the user of an incoming call in a cell phone device can be performed in many ways, like electro-mechanical vibration of the device, emission of sound waves (phone-ring) or emission of light-waves. Each of these exemplary operations requires a varying amount of power. Using the same power level for such multiple features makes the functionality of the power management unit very inflexible.

An Integrated circuit device may be put into a 'hibernate' condition, where its voltage is so low that it can only save the state of its storage element, like volatile memory or shift registers. However, it cannot operate or function as far as running high level operations, multimedia applications, high speed data transfer or any CPU intensive processes are concerned. These devices may also be put into a very low voltage to a no voltage condition, wherein the capability to perform any external user related operations is not existent.

It is desired that in the above stated conditions, such devices should be capable of controlling the voltage source level, so that when needed, the voltage level can be increased to a level to allow higher level operations and functions and the transitions between different voltage levels be made possible.

Conventional power management devices do not have the capability to control their voltage source when in the zero to low power modes. They also lack any programmability for the same. There is also a lack of secure programmable power modes. There is thus, a need for a power management scheme flexible enough to accommodate varying power modes of an IC device and thereby provide the facility of managing and controlling the voltage source, independent of the main CPU or the processor, when the device is in one of such low power modes.

SUMMARY OF THE INVENTION

The present invention is directed to a method for managing various low power modes in a mobile device that substantially obviates one or more problems and disadvantages of the related art.

There is provided a power management unit which has the ability to take decisions for controlling the voltage levels of a power source by means of a state machine and various dynamic register sets. The ability to take the above mentioned decisions are independent from the CPU or the main processor or the controller associated with the operation of the device. The power management schema can also be implemented via programming, with in built security of its own. The state machine lies at the heart of this decision making capability of the power management unit by controlling the various transitions between different power modes.

The state machine and an external interface including its associated Input/Output lines are always powered on and are used to manage chip power modes and power mode transitions. The three main power modes as defined by the states of the state machine are: RUN, HIBERNATE and POWERDOWN. They are distinguished mainly on the basis of their operating voltages. For example, once the device is in HIBERNATE or POWERDOWN modes, the power supplies to the IC are either reduced, or completely disconnected except for this controller state machine.

The present invention's state machine and control mechanism will bring the chip to RUN mode, in response to some external "wakeup event". This is achieved by managing the state of the external power supplies through a control interface.

An additional benefit achieved in the present invention is the small die size and the overall extreme low power consumption of the IC. Another feature of the present embodiment of the invention is the adaptability in usage by many different types of external Power Management Units (PMUs) and Power Sources supplied by various vendors and manufacturers, available readily in the market.

In another embodiment of the invention, the power management scheme can be used with different forms of communication setups and protocols, well known in the art, like I2C, I2S, UART, GPIO etc. to communicate, manage and control the external power sources.

The state machine can be implemented either in hardware or software or in a combination thereof. Further embodiments, features and advantages of the present invention, as well as the structure and operation of the various embodiments of the present invention, are described in detail below with reference to the accompanying drawings.

It is to be understood that the foregoing general description and the following detailed description are exemplary and explanatory and are intended to provide further explanation of the invention as claimed.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
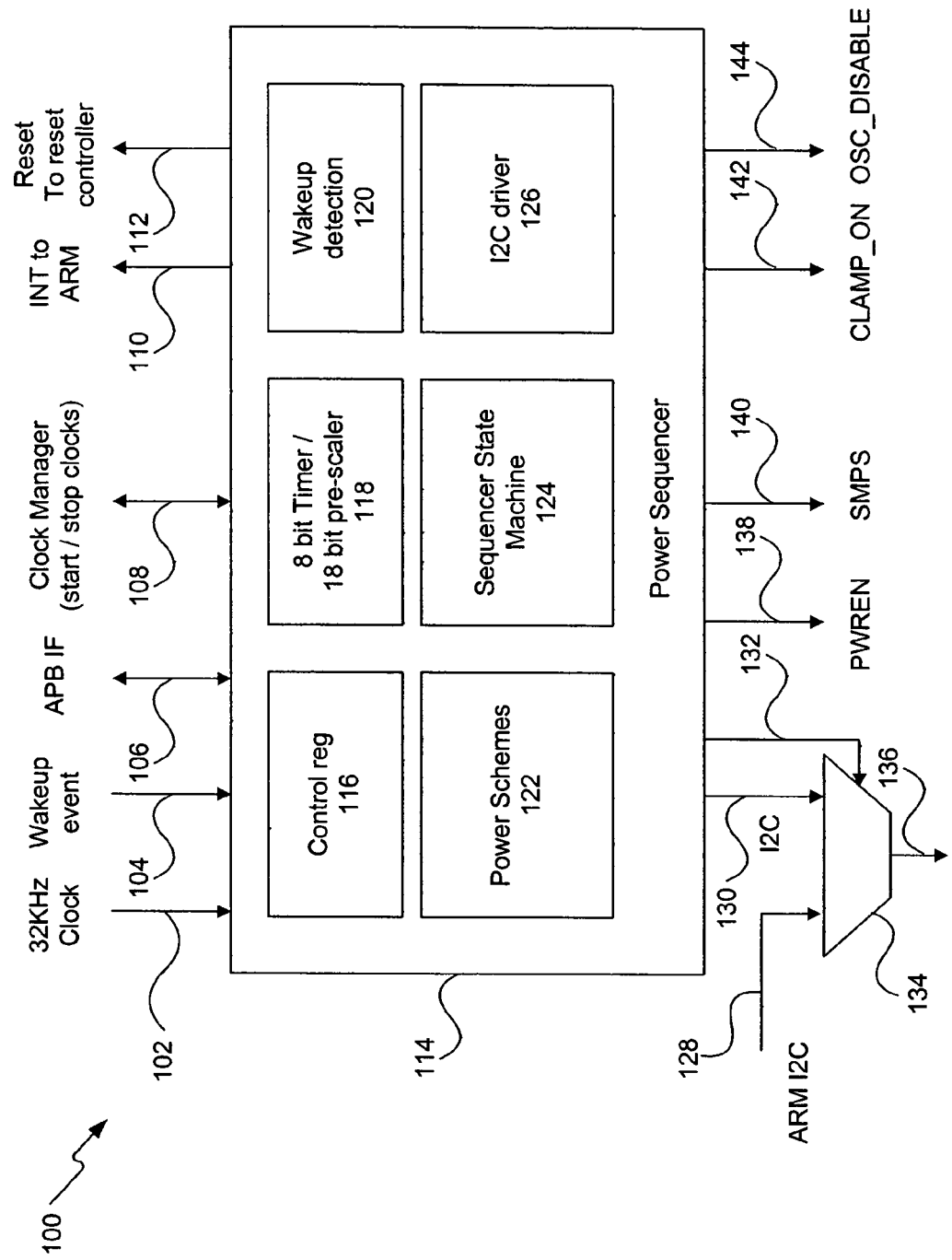
FIG. 1 illustrates a block diagram of a power sequencer according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

FIG. 1 illustrates a power sequencer 100, according to an example embodiment of the invention. The power sequencer 100 is a type of a power management unit which can be implemented on the chip as an independent module or as a part of a bigger integrated circuit (IC).

As shown in FIG. 1, power sequencer 100 includes a power sequencer module 114 with programmable hardware and circuitry for implementing a control register set 116, an 8 bit timer/18 bit pre-scaler 118, a wakeup detection circuit 120, power scheme module 122, a sequencer state machine 124 and an I2C driver 126. The power sequencer 100 can generally be used with the aim of categorizing and distinguishing various power modes of any IC device and to control the transitions between these various modes depending mainly upon the voltage level required by a particular application the IC device is being used for. For example, power and voltage requirements for a display in a "screen-saver" mode are different from those for a display which is outputting a dynamic multimedia video stream. In other situations, the transitions between these different power modes can occur at irregular intervals. The power sequencer 100 is used for managing such power mode transitions, independent from an external processor, as will be described. Depending upon the various voltage levels, the power sequencer 100 categorizes the various power modes into one of three modes (shown in FIG. 2): a RUN mode 202, a HIBERNATE mode 204 and a POWERDOWN mode 206. These modes and the transitions that the IC device makes between them will described in more detail later.

The control register set 116 is a set of registers which receives commands from an external host and passes it to the sequencer state machine 124. The external host or a CPU pre-configures the control register set 116 to store various information regarding the functioning of the power sequencer 100. Some of this information might include whether an SMPS or an external PMU is being used as a power source, whether an interrupt from an external event is pending or not, whether an external event detection feature is enabled or not, etc. amongst other information. More details on the control register set 116 will be put forth in the following paragraphs.

The power scheme module 122 is basically a small programmable random access memory (RAM) that stores information about power settings for different external PMUs. The power schemes module 122 stores data on how to control the SMPS or the external PMU and pre-defines what the various power modes, viz. the RUN mode 202, the HIBERNATE mode 204 and the POWERDOWN mode 206, require in terms of the voltage levels. For example, different PMUs may have different bit sequences for the various power modes and the power scheme module 122 stores these values for a particular PMU. More details on the power scheme module 122 will be put forth in the following paragraphs.

The sequencer state machine 124 is used to execute any command written by an external host in the power scheme module 122 regarding various voltage levels to switch to for the various power modes. The sequencer state machine 124 forms the core of the design for the power sequencer 100.

The 8 bit timer/18 bit pre-scaler 118 is used to put delays between various external events that may trigger the transitions between various power modes and to determine the wait-times separating two such different events by calculating a pre-scaled time value.

The wakeup detection circuit 120 can detect 16 different types of external events which can bring the IC device from the POWERDOWN mode 206 or the HIBERNATE mode 204 to the RUN mode 202. The wakeup detection circuit 120 can optionally also detect off the chip de-bounce events like interrupts from a mouse device or a keypad controller in a mobile phone, for example.

The I2C driver 126 drives an external PMU bus when an external PMU is used as a power source or when the I2C bus is used for any other data transfer processes.

The power sequencer 100 also includes many input and output signals for communicating with an external processor or a CPU, an external power management unit (PMU), a switched mode power supply (SMPS), an I2C bus, an external clock manager and an external controller. The signals shown in FIG. 1 for such communication purposes include a 32 KHz Clock input signal 102, a wakeup event input signal 104, an Advanced Peripheral Bus Interface (APB IF) input output signal 106, a clock manager interface 108, an interrupt output signal 110, a reset output signal 112, an ARM I2C output signal 128, an I2C output signal 130, an I2C multiplexer 134, an output control signal 132, a multiplexer output signal 136, a Power Enable output signal 138, an SMPS output signal 140, a CLAMP_ON output signal 142 and an oscillator disable signal 144.

The power sequencer 100 can be implemented as a stand alone chip, as a sub-module, as a part of a bigger schematic or a combination thereof. The power sequencer 100 receives instructions from an external processor or an external Central Processing Unit (CPU), not shown in the FIG. 1. When the electronic IC device, of which the power sequencer 100 is a part of, is turned on, the external processor sends various instructions to the control register set 116. This period is known as the pre-programming phase. During the pre-programming phase when an external processor is sending commands to the power sequencer 100, the power sequencer 100 operates at a clock speed which is much higher than 32 KHz, and usually at the speed of an external high speed system clock (not shown in FIG. 1), ranging from the sub-MHz range to around 50 MHz.

The external system clock communicates with the power sequencer module 114 via the APB IF input output signal 106. This clock is used to program the various programmable registers in the control register set 116. Once the various registers of the control register set 116 have been programmed, the power sequencer module 114 essentially has the necessary intelligence and decision making capabilities required for power control purposes, which are independent from any external processor or CPU.

It is well known to those skilled in the art that the power consumption of any clocked IC device increases with the clock speed. To substantially obviate this limitation, the power sequencer module 114, does not use the external high speed system clock via APB IF input output signal 106 during the pre-programming phase of the control register set 116. In other words, the input part of the APB IF input output signal 106 is gated off (and is then unidirectional), once the control register set 116 has been programmed. The power sequencer module 114 then switches to the 32 KHz clock input signal 102, which is substantially an order lower in speed than the external system clock, which was earlier being input through the APB IF input output signal 106. As a result of this switching, the net power consumption of the power sequencer module 114 considerably reduces. In the following sections, the registers included in the power sequencer module 114 will be described in further detail, in accordance with one of the embodiments of the present invention.

1. The Control Register Set 116

Figure 4:
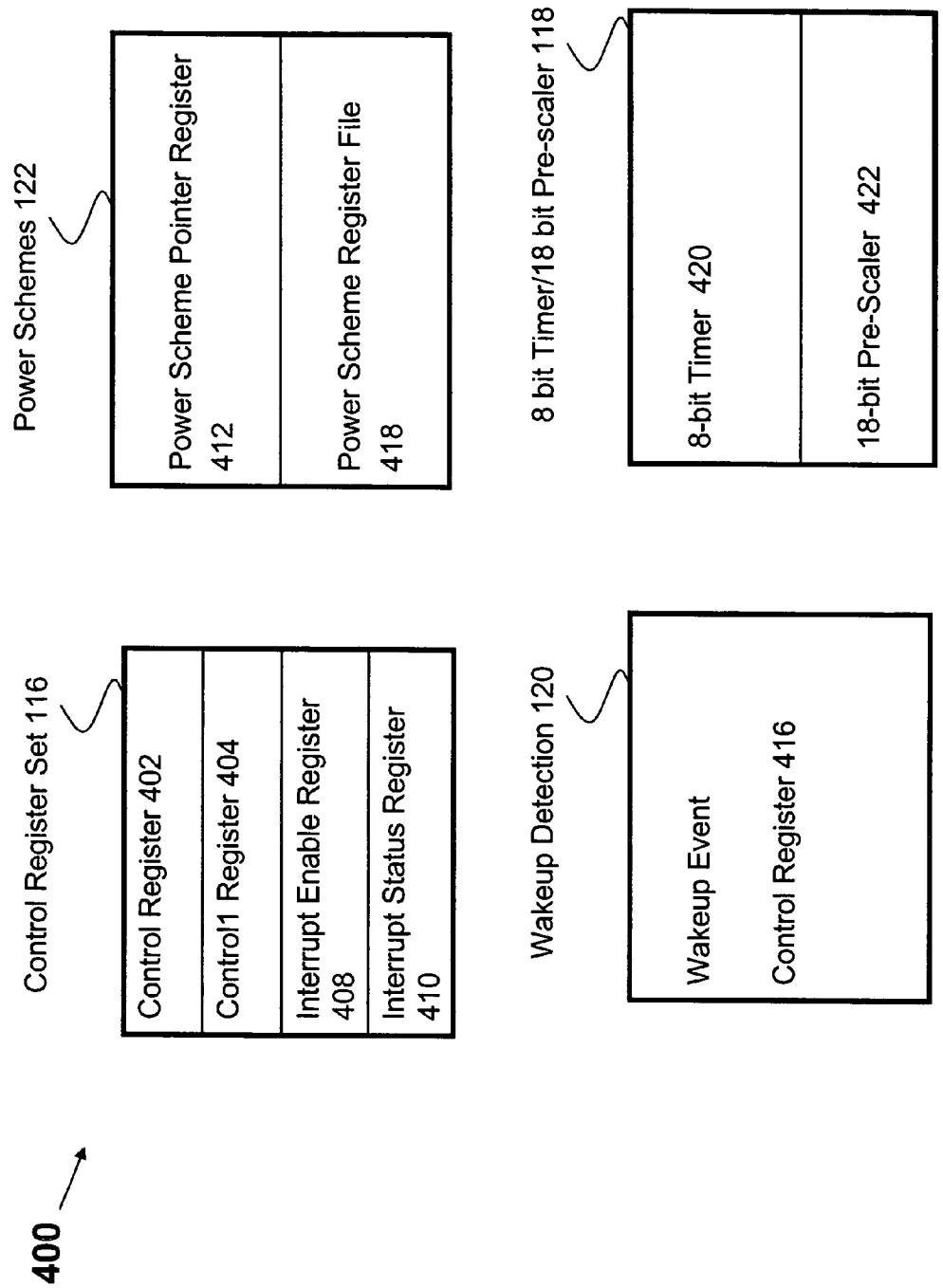
FIG. 4 illustrates a set of registers that are a part of the power sequencer.

FIG. 4 illustrates the Control Register set 116 in more detail. The Control Register set 116 includes, four registers: Control Register 402, Control1 Register 404, Interrupt Enable Register 408, Interrupt Status Register 410. The Control Register 402 is a 32 bit register. Signals are provided to read from or write to the Control Register 402. It is one of many other register sets included in the different elements of the power sequencer module 114.

In one of the embodiments, the control register 402 receives commands from an external processor or CPU. In conventional computer and mobile electronic systems, a processor or the CPU, external to the power management unit is solely responsible for controlling different power modes. That is, the power management unit of such a conventional computer system has no intelligence or decision making capability of its own as such.

The control register 402 is one of the registers that gets pre-programmed by the external processor or the CPU. The pre-programming phase takes place before the other elements of the power sequencer module 114 are activated. During this time the APB IF input output signal 106 inputs an external system clock (not shown in any figure) to the control register 402. Depending upon the overall system architecture of the electronic IC device, the external system clock may or may not be common to the power sequencer module 114 and the external processor. In either case, the APB IF input output signal 106 is at least an order of magnitude higher in speed than the 32 KHz clock input signal 102. During the stage when the control register 402 is being pre-programmed, the 32 KHz clock input signal 102, not active, or is in an "OFF" state. The bits corresponding to the control register 402 are further classified as types "Write (W)", "Read (R)" or "Read Write (RW)".

Bit [0] of the control register 402 is a "Read" bit. Any attempt, external or internal, to "Write" to this bit is ignored. The "Read" returns a 32 KHz clock gate enable status. Therefore, the information obtained from this bit corresponds to the status of the 32 KHz clock input signal 102. A binary '1' in this bit means the 32 KHz clock input signal 102 is activated and a binary '0' in this bit means the 32 KHz clock input signal 102 is de-activated. In the latter case, either the whole electronic IC device is totally shut off or the control register 402 is being pre-programmed, as described before. Bit [0] is a hardware controlled bit and is set at a "high" (corresponding to binary level '1') by default.

Bit [1] of the control register 402 is a "Read" bit. Bit [1] indicates if the previous write to the control register 402 is successful or not. A binary '1' indicates success whereas a binary '0' indicates a failure.

Bit [2] of the control register 402 is a "Read Write" bit. Bit [2] indicates if the APB IF input output signal 106 has an external system clock enabled to it or not. A binary '1' is used to enable this system clock and a binary '0' is used to disable this system clock. As explained above, the system clock is disabled after the pre-programming of the control register set 116 by an external processor or a CPU is complete. As an example, if the bit [2] is set to a binary '0', it indicates that the 32 KHz clock input signal 102 is active. This bit is controlled by an external software.

Bit [3] of the control register 402 is a "Read Write" bit. Bit [3] indicates to the power sequencer module 114 to operate the device in the RUN mode 202, as mentioned earlier. It may additionally be used to apply a RUN mode 202 control signal to a Switched Mode Power Supply (SMPS), external to the power sequencer module 114. The communication between the power sequencer module 114 and the external SMPS takes place via the SMPS output signal 140. This RUN control signal will result from a "Write" to the bit [3]. A "Read" to the bit [3] returns the current status of the "RUN" control signal.

Bits [4:7] are "Read Write" type bits. A "Read" to the bits [4:7] returns the current value of the SMPS voltage. A "Write" to bits [4:7] results in a change in the voltage applied to the SMPS under the condition that a bit [10] (to be described below) is set at a binary '1'. If the bit [10] is set at a binary '0', a "Write" to the bits [4:7] is ignored.

Bits [8:9] are "Read Write" type bits. A "Read" to the bits returns the current power enable status. A "Write" to the bits results in a change in a set of external power enable pins which communicate with the power sequencer module 114 via the power enable output signal 138 under the condition that a bit [11] (to be described below) is set at a binary '1'. If the bit [11] is set at a binary '0', the "Write" to these bits is ignored. The bits [8:9] directly control the set of external power enable pins to an external power management unit (PMU)

Bit [10] is a "Write" type bit. A binary '1' written to the bit [10] indicates that the SMPS operating voltage will be changed to that corresponding to the RUN mode of operation. A "Write" to the bit [10] corresponding to a binary '0' will have no effect on the operating voltage.

Bit [11] is a "Write" type bit. A "Write" to the bit [11] indicates that the power sequencer module 114 can communicate with the external PMU via the power enable output signal 138 to enable the change in the status of the power level of the external PMU. A "Write" to the bit [11] corresponding to a binary '0' will have no effect on the status of the power enable output signal 138.

Bit [12] is a "Write" type bit. A binary '1' written to the bit [12] enables a transition corresponding to the RUN mode 202 to the HIBERNATE mode 204 of the sequencer state machine 124. A binary '0' written to the bit [12] has no effect on the sequencer state machine 124.

Bit [13] is a "Write" type bit. A binary '1' written to the bit [13] enables a transition corresponding to the RUN mode to the POWERDOWN mode of the sequencer state machine 124. A binary '0' written to the bit [13] has no effect on the sequencer state machine 124.

Bit [14] is a "Write" type bit. A binary '1' written to the bit [14] enables a change in the operating voltage from one voltage to another. A binary '0' written to the bit [14] has no effect on the sequencer state machine 124.

Bit [15] is a "Read Write" type bit. A "Write" to the bit [15] enables a signal to change the low power mode applied to an SMPS under the condition that the bit [11] is set at binary '1'. If the bit [11] is set a binary '0', the "Write" operation is ignored. A "Read" to the bit [15] enables the current low power mode for the external SMPS.

Bits [16:31] are "Write" type bits. They correspond to a security access code of the control register 402.

The write to the control register 402 succeeds only if security access code in the bits [16:31] match an external key. The external key is a preset value corresponding to a number. This external key may be stored in hardware or by means of a software external to the power sequencer module 114.

2. The Control1 Register 404

A control1 register 404 is a part of the control register set 116. The control1 register 404 is a 32 bit register which stores some of the information for various control functions of the power sequencer module 114. The bits of the control1 register 404 are all "Read Write" type bits. The individual bits and their roles will now be described in more detail.

Bits [0] is set at binary level '0', by default and is always held at that constant level.

Bits [1:7] store the PMU I2C bus slave address. This is useful when a communication between the power sequencer module 114 and an external PMU (not shown in FIG. 1) takes place.

Bits [8:9] are used to select an SMPS or an external PMU, as the case might be. This is done according to the following scheme:

If the bit sequence is a binary '00', it means that the external SMPS is the default power supply for the electronic IC device. If the bit sequence is a binary '01', it means that an external PMU, communicating with the power sequencer module 114 over an I2C output signal 130, is the means for handling the power scenario for the system in consideration. If the bit sequence is a binary '10', it means that an external PMU, communicating with the power sequencer module 114 over a pair of 2 wire power enables only (not shown in the picture), is the means for handling the power scenario for the electronic IC device in consideration. If the bit sequence is a binary '11', it means that the power management of the electronic IC device is being handled by an external PMU, communicating with the power sequencer module 114 over an I2C output signal 130 and a pair of 2 wire power enables.

Bit [10] is used as a control to disable an external oscillator in the HIBERNATE mode via the oscillator disable signal 144.

Bit [11] is used as a control to disable an external oscillator in the POWERDOWN mode via the oscillator disable signal 144.

Bits [12:31] are reserved bits. A "Read" to these bits returns all zeros and a "Write" to these bits has no effect on the bits' status.

3. The Interrupt Enable Register 408

An Interrupt Enable register 408 is used to enable the interrupts to the power sequencer 100 and accordingly decide the state of the sequencer state machine 124. The Interrupt Enable Register is a 32 bit register. All the bits in the Interrupt Enable Register are "Read Write" type. The individual bits are described in more detail below.

Bit [0] enables an external event to wakeup the system before a RUN mode 202 to HIBERNATE mode 204 timer, TimerRH of Table III expires. A binary '0' written to it disables this bit. By default, it is set at a binary level '1', which indicates that the wakeup detection feature is enabled.

Bit [1] enables an external event to wakeup the system before a RUN mode 202 to a POWERDOWN mode 206 timer, TimerRD of Table II, expires. A binary '0' written to it disables this bit. By default, bit [1] is set at a binary level '1', which indicates that the wakeup detection feature is enabled.

Bit [2] enables an external event to wakeup the system before a HIBERNATE mode 204 to POWERDOWN mode 206 timer, TimerHD of Table III, expires. A binary '0' written to it disables this bit. By default, it is set at a binary level '1', which indicates that the wakeup detection feature is enabled.

Bit [0] and bit [2] actually disable the wakeup event detection circuit 120 before the timers, TimerRH and Timer HD, expire.

Bit [3] enables an external event to transition the sequencer state machine 124 from a first RUN mode to a second RUN mode. A binary '0' written to it disables this bit. By default, it is set at a binary level '1', which indicates that the wakeup detection feature is enabled.

Bits [4:31] are reserved for internal system use. A "Read" to these bits results in all zeros being read out and a "Write" to these bits has no effect on them.

4. The Interrupt Status Register 410

The Interrupt Status register 410 is used to get information about the status of various transitions 208,210,212,214,216 and 218 (shown in FIG. 2) of the sequencer state machine 124, described elsewhere in this specification. There are 32 bits in the Interrupt Status register 410 with each bit being a "Read/Write" type of bit.

Bit [0] gives the status of the sequencer state machine 124 before the timer, TimerRH, expires. When a "Read" is made to the bit [0], a binary '1' returned back indicates that an interrupt is pending, a binary '0' indicates that no interrupt is pending. A "Write" corresponding to a '1' to the bit[0] is used to clear the interrupt and a "Write" corresponding to a '0' bit has no effect.

Bit [1] gives the status of the sequencer state machine 124 before the timer, TimerRD, expires. When a "Read" is made to the bit [0], a binary '1' returned back indicates that an interrupt is pending, a binary '0' indicates that no interrupt is pending. A "Write" corresponding to a '1' to the bit[0] is used to clear the interrupt and a "Write" corresponding to a '0' bit has no effect.

Bit [2] gives the status of the sequencer state machine 124 before the timer, TimerHD, expires. When a "Read" is made to the bit [0], a binary '1' returned back indicates that an interrupt is pending, a binary '0' indicates that no interrupt is pending. A "Write" corresponding to a '1' to the bit[0] is used to clear the interrupt and a "Write" corresponding to a '0' bit has no effect.

Bit [3] gives the status of the sequencer state machine 124 before a transition by the sequencer state machine 124 from a first RUN mode 202 to a second RUN mode 202. When a "Read" is made to the bit [0], a binary '1' returned back indicates that an interrupt is pending, a binary '0' indicates that no interrupt is pending. A "Write" corresponding to a '1' to the bit[0] is used to clear the interrupt and a "Write" corresponding to a '0' bit has no effect.

Bits [4:31] are reserved bits for internal system use. A "Read" to these bits returns all zeros and a "write" to these bits has no effect.

5. The Power Scheme Pointer Register 412

The Power Scheme Pointer Register 412 is a part of the power scheme module 122. The Power Scheme Pointer Register 412 is a 32 bit register. The Power Scheme Pointer Register 412 contains the pointers to the addresses of 32 registers in the Power Scheme Register file 418 (described immediately below) where different settings for the various power modes are stored. Depending upon the bit settings of the Power Scheme Pointer Register 412, the power sequencer 100 will know the addresses where the voltage settings for different power mode transitions are stored in the Power Scheme Register file 418. All the bits of the Power Scheme Pointer Register 412 are "Read Write" type.

Bits [0:5] serve as a pointer to the Power Scheme Register file 418 for the RUN mode 202 settings.

Bits [6:7] enable two lines for the RUN mode 202 settings when an external PMU is being used. These bits are not used for an SMPS.

Bits [8:13] serve as a pointer to the Power Scheme Register file 418 for the HIBERNATE mode 204 setting.

Bits [14:15] enable two lines for the HIBERNATE mode 204 settings when an external PMU is being used. These bits are not used for an SMPS.

Bits [16:21] serve as a pointer to the Power Scheme Register file 418 for the POWERDOWN mode 206 setting.

Bits [22:23] enable two lines for the POWERDOWN mode 206 settings when an external PMU is being used. These bits are not used for an SMPS.

Bits [24:29] serve as a pointer to the Power Scheme Register file 418 for a first RUN mode 202 to a second RUN mode 202 setting.

Bits [30:31] enable two lines for the RUN mode 202 to Run mode 202 setting when an external PMU is being used. These bits are not used for an SMPS.

6. The Power Scheme Register File 418

The Power Scheme Register File 418 is also a part of the power scheme module 122. The Power Scheme Register File 418 is a 10 bit×32 register file used to store various power schemes to manage the SMPS and the external PMU using an I2C protocol, well known to those skilled in the art. Depending on whether an SMPS or an external PMU is being used, an external software or a microcode can be used to program the various registers for various power modes in the power scheme register file 418. The generic format to program the data, which is sent over the I2C bus, is described below. All the bits in the Power Scheme Register file are "Read Write" type.

Bits [0:7] are used to communicate with the PMU over the I2C bus, external to the power sequencer module 114. This involves the power sequencer 114 gaining control over the I2C multiplexer 134, via the output control signal 132. The power sequencer 114 is connected to the external I2C bus via the multiplexer output signal 136 of the I2C multiplexer 134.

Bits [8:9] are used to control a power scheme list. The power scheme list helps in deciding whether, for a particular scheme a next entry is a data byte or an address byte depending upon the bit combinations, as shown below:

'11': Reserved;
'10': Next entry is an address byte;
'11': Next entry is a data byte; and
'00': Current entry is the last byte in the power scheme.

Figure 2:
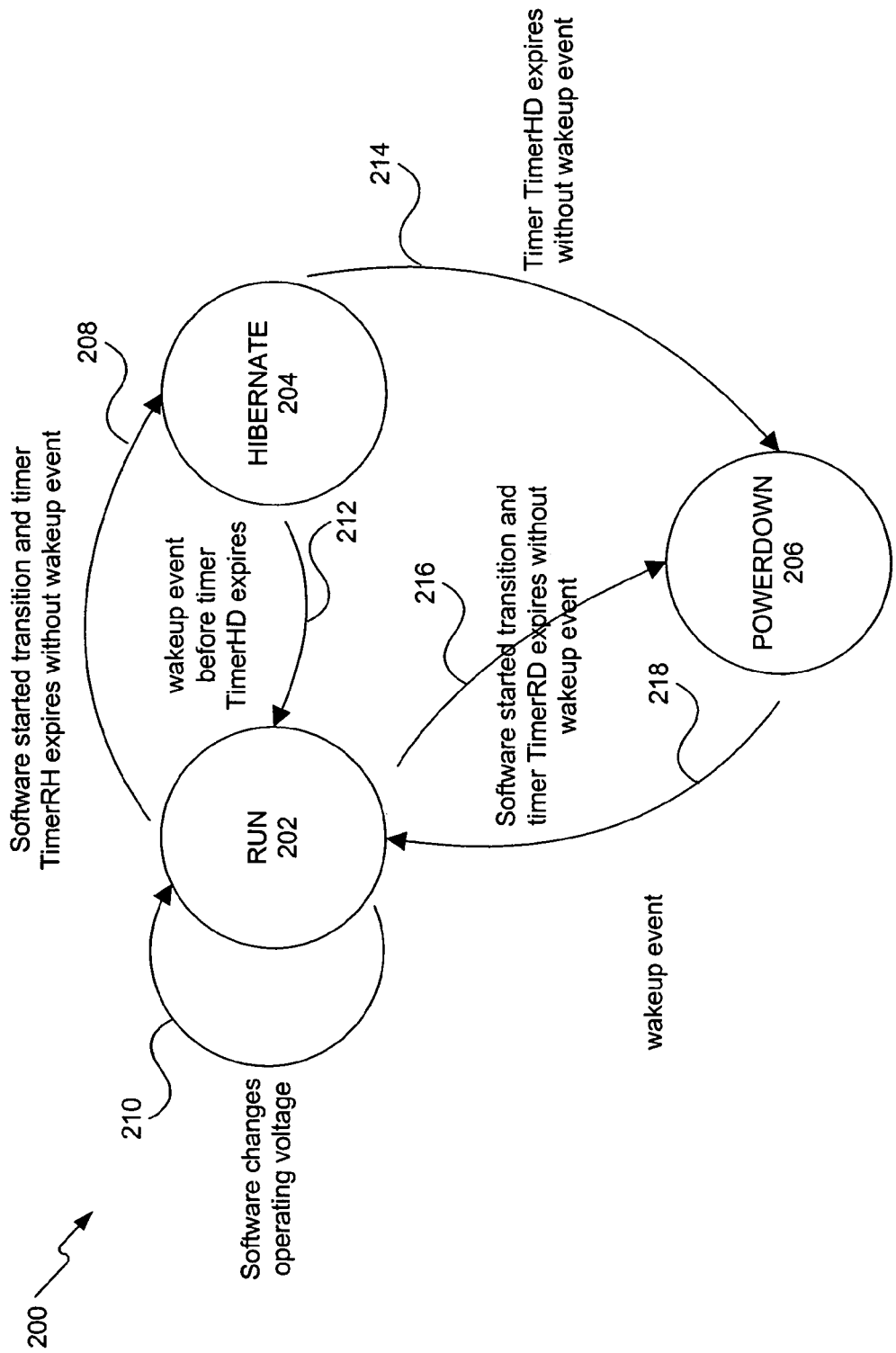
FIG. 2 illustrates a power state transition diagram in accordance with one embodiment of the present invention.

The details of the settings stored in the Power Schemes Register File 418 for handling the various power modes will now be described. For any of the 32 registers of the Power Schemes Register File 418, there are 2 bits which can be used as a TimDiv bit pair. The TimDiv bit pair denotes the binary equivalent for a time interval for which any of the given power mode transitions 208-218 (as shown in FIG. 2) have to wait for. The allotment of the 2 bits in any particular 10 bit register (out of 32 such registers), depends upon the way the microcode or the external software is written, and is beyond the scope of this specification. However, such an allotment is well known to those skilled in the art. Table I shows how the values of the TimDiv bit pair translate (or scale) to the real time durations as stored in the 8 bit timer/18 bit pre-scaler 118.

TABLE I

| Binary value of TimDiv bit pair | Corresponding 8 bit timer/ 18 bit pre-scaler 118 value |
|---|---|
| 00 | 1 (32.5 microseconds) |
| 01 | 64 (2 milliseconds) |
| 10 | 4096 (128 milliseconds) |
| 11 | 262144 (8192 milliseconds) |

As mentioned earlier, the information about whether an SMPS or an external PMU is being used, is obtained from the bits [8:9] of the control1 register 404 in the control register set 116.

Based on the values stored in the 10 bits of each of the registers of the Power Schemes Register File 418, settings for the different power modes are determined.

1. Exemplary settings for the POWERDOWN mode 206 can be explained by the Table II below:

TABLE II

| SMPS entry | PMU entry | Name | Description |
|---|---|---|---|
| 0 | 0 | {TimDiv, TimerRD} | Clock pre-scaler and TimerRD |
|  | 1 | {5'b0, Run, Voltage} | If SMPS is used |
| 1 | 1 → n | Data over I2C | If external PMU is used |

Each row of the Table II can be thought of as one of the 32 rows in the Power Scheme register File 418. If an SMPS is used, the first row of the Power Scheme Register File 418 stores 2 bits out of a total of 10 for the TimDiv value (or the clock pre-scaler as shown in Table I above). The rest 8 bits are used for storing the 8-bit timer 420 value. This corresponds to the duration of time the power sequencer 100 should wait before making the transition 216 from the RUN mode 202 to the POWERDOWN mode 206 and is denoted by a variable TimerRD. The next row of the Power Scheme Register File 418 stores 1 bit for the RUN mode 202 and 4 bits for the corresponding voltage level. Therefore, if the 1 bit for the RUN mode 202 is set at a binary '1', the power sequencer 100 understands that the transition is from the RUN mode 202 to the POWERDOWN mode 206. The remaining 5 bits, shown as 5'b0 are don't care bits and depend upon the external software or the microcode being used. The rest of the rows, shown as 1 to n, are used if an external PMU is being used. Since the settings for the external PMU will vary from manufacturer to manufacturer, the Power Scheme Register File 418 can store up to n such settings and the value of n will depend upon the specific application for which the power sequencer 100 is being used for. In the case when an external PMU is used, the 10 bits of each of the n registers is used to place data over an external I2C bus using standard I2C protocol, well known to those skilled in the art. Also, the RUN mode 202 to the POWERDOWN mode 206 transition 216 will only start from the entry 0 but the HIBERNATE mode 204 to the POWERDOWN mode 206 transition 214 will only start from entry 1, as shown in Table II.

2. Exemplary settings for the HIBERNATE mode 204 can be explained by the Table III below:

TABLE III

| SMPS entry | PMU entry | Name | Description |
|---|---|---|---|
| 0 | 0 | {TimDiv, TimerRH} | Clock pre-scaler and TimerRH |
| 1 | 1 → n | {5'b0, Run, Voltage} Data over I2C | If SMPS is used If external PMU is used |
| 2 | n + 1 | {TimDiv, TimerHD} | Clock pre-scaler and TimerHD |

Similar to Table II immediately above, Table III shows the settings for the transition 208 from the RUN mode 202 to the HIBERNATE mode 204 (as shown in the first three rows of Table 3) and for the transition 214 from the HIBERNATE mode 204 to the POWERDOWN mode 206 (as shown in the last row of Table III). A TimerHD value shown in the last row of Table III is the 8 bit timer 420 value corresponding to the amount of time the power sequencer 100 should wait before making the transition 214 from the HIBERNATE mode 204 to the POWERDOWN mode 206. Similarly, a TimerRH value in the first row of Table III is the 8-bit timer 420 value corresponding to the amount of time the power sequencer 100 should wait before making the transition 216 from the RUN mode 202 to the HIBERNATE mode 204.

3. Exemplary settings for the RUN mode 202 can be explained by the Table IV below:

TABLE IV

| SMPS entry | PMU entry | Name | Description |
|---|---|---|---|
| 0 | 0 → n | {5'b0, Run, Voltage} Data over I2C | If SMPS is used If external PMU is used |
| 1 | n + 1 | {TimDiv, TimerDR} | Clock pre-scaler and TimerDR |

Table IV shows the settings for the transition 218 from the POWERDOWN mode 206 to the RUN mode 202. A TimerDR value shown in the last row of Table III is the 8 bit timer 420 value corresponding to the amount of time the power sequencer 100 should wait before making the transition 218 from the POWERDOWN mode 206 to the RUN mode 202.

4. Exemplary settings for the transition 210 from a first RUN mode 202 to a second RUN mode 202 and the transition 212 from the HIBERNATE mode 204 to the RUN mode 202 are shown in Table V below:

TABLE V

| SMPS entry | PMU entry | Name | Description |
|---|---|---|---|
| 0 | 0 → n | {5'b0, Run, Voltage} Data over I2C | If SMPS is used If external PMU is used |
| 1 | n + 1 | {TimDiv, TimerRR/TimerHR} | Clock pre-scaler and TimerRR/TimerHR |

A TimerRR value shown in the last row of Table III is the 8 bit timer 420 value corresponding to the amount of time the power sequencer 100 should wait before making the transition 210 from a first RUN mode 202 to a second RUN mode 202. A TimerHR value shown in the last row of Table III is the 8 bit timer 420 value corresponding to the amount of time the power sequencer 100 should wait before making the transition 212 from the HIBERNATE mode 204 to the RUN mode 202. It is to be noted that the transition 210 is assumed as the most recent power scheme by the electronic IC device. If an external software uses any other means to adjust the settings for the SMPS or the external PMU, then it is the responsibility of the external software to update the transition before a transition 208 from the RUN mode 202 to the HIBERNATE mode 204 can be initiated.

The control register 402 and the interrupt status register 410 directly run from an external system clock via the APB IF input output signal 106. The rest of the system clock domain logic runs as controlled by the bit [2] of the control register 402.

According to one embodiment of the present invention, the 32 KHz Clock input signal 102 is mainly used to enable a wakeup event detection logic resident in a wakeup detection circuit 120. Bit [0] of the Control Register is used to control the 32 KHz clock input signal 102. As mentioned earlier, the bit [0] is high by default. The signal level on the 32 KHz Clock input signal 102 will be turned to a high when an external processor or a CPU commands a power transition or when the sequencer state machine 124 transits out of a POWERDOWN mode 206, in which case the 32 KHz Clock input signal 102 will be turned to a low.

In one embodiment of the present invention, an 8 bit timer/18 bit pre-scaler 118 as shown in FIGS. 1 and 4, is present in the Power sequencer module 114 to time various events. The 18 bit pre-scaler 420; in FIG. 4, can be set to a numerical value of 1, 64, 4096 or 262144. The achievable timer counts and resolution are summarized by the following Table VI.

TABLE VI

| Pre-scaler | Timer Count Range | resolution |
|---|---|---|
| 1 | 0 → 8 ms | 31.25 us |
| 64 | 0 → 512 ms | 2 ms |
| 4096 | 0 → 32.768 s | 128 ms |
| 262144 | 0 → 2097.152 s (35 mins) | 8192 ms |

The 8 bit timer 418; in FIG. 4, starts counting down whenever a value is loaded to it and will stop counting once it reaches zero.

7. The Wakeup Event Control Register 416

The Wakeup event control register 416 is a part of the wakeup detection circuit 120. All the bits of this register are "Read Write" type bits.

Bits [0:15] are used to enable the detection of an external event, which can result in a possible wakeup of the system from one of the low power modes.

Bits [16:23] are used to enable a de-bounce for the external wakeup event. A binary '1' written to these bits enables the detection of a debounce, which can result from any external activity like movement of the mouse or the hitting of a keyboard key, for example. A binary '0' disables the detection of a debounce.

Bits [24:26] store the information for a de-bounce filter window for all wakeup events if the debounce is in an 'enabled' state, as described immediately above. The time resolution for such a window is decided upon by the status of these three bits which are described as follows:

A '000' denotes a time duration of 1 ms, a '001' denotes a time duration of 2 ms, a '010' denotes a time duration of 4 ms, a '011' denotes a time duration of 8 ms, a '100' denotes a time duration of 16 ms, a '101' denotes a time duration of 32 ms, a '110' denotes a time duration of 64 ms and a '111' denotes a time duration of 128 ms.

Bits [27:31] are reserved for internal use by the system. A "Read" to these bits returns all zeros and a "Write" to these bits has no effect.

According to one embodiment of the present invention, an oscillator disable signal 144 is used by the Power sequencer module 114 to optionally disable the external oscillator during the HIBERNATE mode 204 to the POWERDOWN mode 206 transition 214. As described earlier, the bits [10] and [11] in the Control1 Register 404; in FIG. 4, are used to enable this feature. However, a set of programmable timer counts, whose values are stored in the power scheme register file 418; in FIG. 4, are used for the POWERDOWN mode 206 to the RUN mode 202 transition 218 and for the HIBERNATE mode 204 to the RUN mode 202 transition 212. These timer counts must be programmed long enough to allow the external oscillator, to become stable.

According to one embodiment of the present invention, the Power sequencer module 114 has the capability of being programmed in a secure way so that no malicious code can disrupt the normal operation and functioning. This is achieved through the Control Register 402 whose upper two bytes are used to match with a secret key. If the matching is correct, a "Write" to the Control Register 402 is successful, else it is not. As mentioned earlier, in the description of the Control Register 402, a "Read" to these uppermost bytes returns the values of the bits [0] and [15]. It is recommended that any software external to the Power sequencer module 114 follow the following guidelines to secure all other registers in the Power sequencer module 114, except the control register 402 and the Interrupt Status register 410. By default, the bit [2] of the Control Register 402 is low, thereby disabling the access to all the other registers. Before the software programs any of the registers, the bit[2] of the control register 402 must be written "high" with a security pass-code. After the programming is over, the bit [2] is set back to "low", to disable any access in a post programming period. This will leave only a small window of time for the software to program the registers and prevent any runaway code from modifying the stored power schemes.

Figure 3:
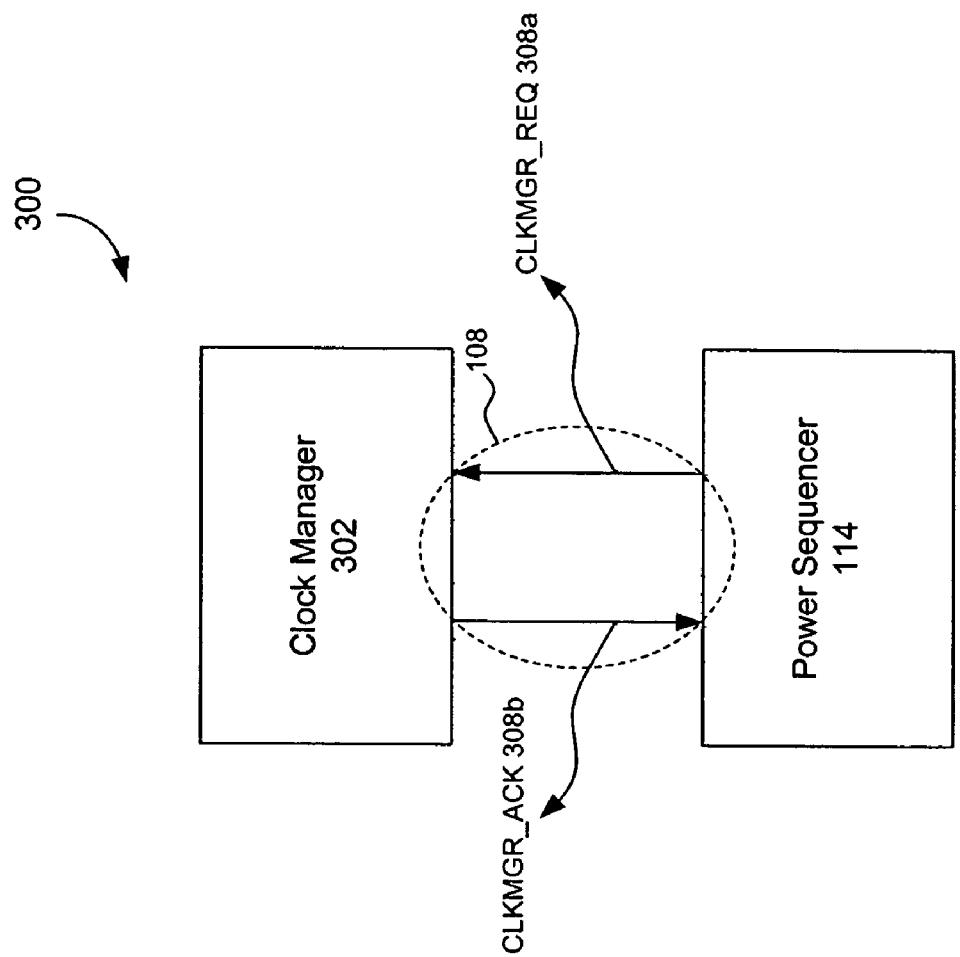
FIG. 3 illustrates an external clock manager interfaced to the power sequencer.

A clock manager interface 108 is used by the Power sequencer module 114 to start and stop certain clocks used for completing the transition of low power modes. The clock manager interface 108 is shown in more detail in FIG. 3. The communication between the clock manager interface and the Power sequencer module 114 takes place through two signals—a CLKMGR_REQ signal 308a and a CLKMGR_ACK signal 308b, as shown in FIG. 3. The CLKMGR_REQ signal 308a and the CLKMGR_ACK signal 308b are used for handshaking purposes. CLKMGR_REQ signal 308a is used to request a clock manager 302 to either start or stop clocks and can only be de-asserted when the CLKMGR_ACK signal 308b goes active. Similarly, the CLKMGR_ACK signal 308b can be de-asserted when the CLKMGR_REQ signal 308a goes active.

The clock manager 302 is a 3 bit register whose bits are encoded as follows.

Bit [0] is used to stop a pre-defined group of clocks. This is used when the sequencer state machine 124 transitions involve the HIBERNATE mode 204.

Bit [1] is used to stop a pre-defined group of clocks. This is used when the sequencer state machine 124 transitions involve the POWERDOWN mode 206.

Bit [2] is used to start a pre-defined group of clocks. This is used when the sequencer state machine 124 transitions the HIBERNATE mode 204 to the RUN mode 202.

The Wakeup detection circuit 120 has an internal set of 16 GPIO (General Purpose Input Output—an industry standard) pads and internal signals that can be programmed to generate an external wakeup event to activate the power sequencer module 114 by changing the state of the sequencer state machine 124. One or more of such external events can make this occur before the sequencer state machine 124 is transitioned into the HIBERNATE mode 204 or the POWERDOWN mode 206 by writing to the wakeup event control register 416, shown in FIG. 4 and described earlier. An external software ensures that the wakeup enabled GPIO pads are programmed as input pads using the 16 GPIO control registers. Debounced versions of all simultaneously occurring external events are Exclusive ORed to generate a single wakeup event to the power sequencer module 114. This results in a wakeup event whenever a level change from a High to a Low or vice-versa is detected. The operation of the Exclusive OR logic is well known to the persons skilled in the art and therefore will not be further described in detail here.

Power Modes

As mentioned earlier, the power sequencer 100 can be in one of the three modes—the RUN mode 202, the HIBERNATE mode 204 and the POWERDOWN mode 206. An external software also might have an additional sleep mode.

The RUN mode 202 is the only operating state in which the processor runs any code. If an SMPS is being used, the electronic IC device initially powers up from a core reset value with a voltage 1.2 Volts. However, this can be reduced by the external software if deemed necessary. If an external PMU is being used, the initial power up voltage supplied is 1.2 Volts.

The HIBERNATE mode is a low power consumption mode that allows the electronic IC device to maintain logic state and memory contents. The external processor clock is stopped and any peripherals and any Direct Memory Access (DMA) stop operating. When in the HIBERNATE mode 204, the core power supply is reduced to a value preset by the external software. Typically this is set to around 0.6 Volts.

The POWERDOWN mode 206 is a very low power consumption mode. All analog components of the electronic IC device including the SMPS are disabled and the external processor core is completely de-powered to reduce leakage. If an external PMU is used then the processor core is reduced to an output of 0 Volts. Any secure Real Time Communication and Input Output lines remain powered on in this mode.

The transitions 208, 210 and 216 out of the RUN mode 202 can be started by the external processor and are managed by the power sequencer 100. However, as mentioned earlier, the external processor must pre-program the necessary information into the power sequencer module 114 by providing the timing parameters for all the transitions 208-218.

FIG. 2 describes the various state transition settings possible within the sequencer state machine 124. As described immediately above, there are mainly 3 low power modes: a RUN mode 202, a HIBERNATE mode 204 and a POWERDOWN mode 206. The logical operation of a set of power states 200 will now be described in the following paragraphs.

According to one embodiment of the present invention, some of the possible transitions between various low power modes are listed and described below.

1. Transition 216 from a RUN Mode 202 to a POWERDOWN Mode 206

An exemplary scenario for the transition 216 occurs when the external processor has been idle for a considerable amount of time. In this transition scheme, an external software stops all unnecessary clocks and power supplies. Following this the software pre-programs the power scheme module 122 in the power sequencer module 114. The transition 216 is enabled by writing a binary '1' to bit [13] of the control register set 116. A timer, TimerRD of Table II, will start to count down from a pre-programmed value. This is done to enable an external processor or a CPU to complete all pending operations and enter a 'Wait for Interrupt' state. If an external event is asserted before the TimerRD expires, the sequencer state machine 124 in the power sequencer module 114 will stop the transition 216 and revert back to the RUN mode 202. Along with this, it will also assert a high on the interrupt output signal 110 which communicates with the external processor. However, if the timer expires without any event being asserted, the power sequencer module 114 will start a transition to the POWERDOWN mode 206. The power sequencer module 114 will send a stop clock request over the clock manager input output signal 108 and wait for an acknowledgement. If an SMPS is used, the settings corresponding to the POWERDOWN mode 206 stored in the power scheme register file 418 in the power scheme module 122 will be applied. If an external PMU is used, depending on a particular PMU control configuration, the sequencer state machine 124 may enable the I2C multiplexer 134 and start shifting out a PMU slave address and the POWERDOWN mode 206 settings in power scheme register file 418 of power scheme module 122. Additionally, the sequencer state machine 124 may drive the power enable output signal 138 according to an external software programmed value. Once the transition 216 completes, the power sequencer module 114 will transition to the POWERDOWN mode 206 and monitor for any external event.

2. Transition 208 from a RUN Mode 202 to HIBERNATE Mode 204

The transition 208 is very similar to the RUN mode 202 to the POWERDOWN mode 206 transition 216, as described immediately above, except for the fact that the operating voltages involved correspond to the HIBERNATE mode 204, which is approximately equal to 0.6 Volts. Accordingly, the 8 bit timer/18 bit prescaler 118 is loaded with a value corresponding to the transition 208.

In the transition 208, an external software stops all unnecessary clocks and power supplies. Following this the external software pre-programs all necessary power scheme module 122 in the power sequencer module 114. The transition 208 is enabled by writing a binary '1' to bit [12] of the control register 402. A TimerRH, as shown in Table III, will start to count down from a pre-programmed value. This is done to enable an external processor or a CPU to complete all pending operations and enter a 'Wait for Interrupt' state.

If an external event is asserted before the TimerRH expires, the sequencer state machine 124 in the power sequencer module 114 will stop the transition 208 and revert back to the RUN mode 202. Along with this, it will also assert a high on the interrupt output signal 110 which communicates with the external processor. However, if the TimerRH expires without any event being asserted, the power sequencer module 114 will start a transition 208 to the HIBERNATE mode 204. The power sequencer module 114 will send a stop clock request signal (CLKMGR_REQ 308a) over the clock manager input output signal 108 and wait for an acknowledgement signal (CLKMGR_ACK 308b). If an SMPS is used, the settings corresponding to the HIBERNATE mode 204 stored in the power scheme register file 418 in the power scheme module 122 will be applied. If an external PMU is used, depending on the PMU control configuration stored in the power scheme register file 418, the sequencer state machine 124 may enable the I2C multiplexer 134 and start shifting out the PMU slave address and the POWERDOWN mode 206 settings in the power scheme register file 418 of power scheme module 122. Additionally, the sequencer state machine 124 may drive the power enable output signal 138 according to an external software programmed value. Once the transition 208 completes, the power sequencer module 114 will transition to the HIBERNATE mode 204 and monitor for any external event.

3. Transition 212 from a HIBERNATE Mode 204 to a RUN Mode 202

The transition 212 takes place when the power sequencer module 114 while in the HIBERNATE mode 204 detects an external event, via the wakeup detection circuit 120. If an SMPS is used, the settings corresponding to the RUN mode 202 in the power scheme register file 418 in the power scheme module 122 will be applied. If an external PMU is used, depending on the PMU control configuration stored in the power scheme register file 418, the sequencer state machine 124 may enable the I2C multiplexer 134 and start shifting out the PMU slave address and the RUN mode 202 settings in the power scheme register file 418 of power scheme module 122. Additionally, the sequencer state machine 124 may drive the power enable output signal 138 according to an external software programmed value. Accordingly, the 8 bit timer/18 bit prescaler 118 is loaded with a value corresponding to this transition. When the 8 bit timer/18 bit prescaler 118 counts to zero, the power sequencer module 114 requests, via CLKMGR_REQ 308a signal, an external clock manager 302 to start all necessary clocks. As soon as an acknowledgement (CLKMGR_ACK 308b) from the external clock manager 302 is received, the power sequencer module 114 disables the I2C multiplexer 134 and sends an interrupt to the external processor via the interrupt output signal 110. The external processor will then bring the operating voltage of the electronic IC device corresponding to the RUN mode 202, which is in the range of 0.9 Volts to 1.2 Volts.

4. Transition 218 from a POWERDOWN Mode 206 to a RUN Mode 202

The transition 218 is very similar to the transition 212 from the HIBERNATE mode 204 to the RUN mode 202. If an SMPS is used, the settings corresponding to the RUN mode 202 in the power scheme register file 418 in the power scheme module 122 will be applied. If an external PMU is used, depending on PMU control configuration, the sequencer state machine 124 may enable the I2C multiplexer 134 and start shifting out the PMU slave address and the RUN mode 202 settings in the power scheme register file 418 of power scheme module 122. Additionally, the sequencer state machine 124 may drive the power enable output signal 138 according to an external software programmed value. Accordingly, the 8 bit timer/18 bit prescaler 118 is loaded with a value corresponding to this transition 218. When the 8 bit timer/18 bit prescaler 118 counts to zero, the power sequencer module 114 disables the I2C multiplexer 134 and sends a soft reset pulse via a reset output signal 112. The external processor will then bring the operating voltage of the system corresponding to the RUN mode 202, which is in the range of 0.9 Volts to 1.2 Volts.

5. Transition 214 from a HIBERNATE Mode 204 to a POWERDOWN Mode 206

The transition 214 happens when a timer (TimerHD in Table III) corresponding to the beginning of the HIBERNATE mode 204 expires. The power sequencer 100 then initiates this transition 214 from a HIBERNATE mode 204 to a POWERDOWN mode 206. Any external event will be ignored till the transition 214 completes. If an SMPS is used, the settings corresponding to the POWERDOWN mode 206 in the power scheme register file 418 in the power scheme module 122 will be applied. If an external PMU is used, depending on the PMU control configuration stored in the power scheme register file 418, the sequencer state machine 124 may enable the I2C multiplexer 134 and start shifting out the PMU slave address and the POWERDOWN mode 206 settings in the power scheme register file 418 of power scheme module 122. Additionally, the sequencer state machine 124 may drive the power enable output signal 138 according to an external software programmed value. Once the transition 214 completes, the power sequencer module 114 will transition to the POWERDOWN mode 206 and monitor for any external event.

6. Transition from a POWERDOWN Mode 206 to a HIBERNATE Mode 204

This transition is not supported in any embodiment of the present invention.

7. Transition 210 from a First RUN Mode 202 to a Second RUN Mode 202

The transition 210 is a special case involving transitions from one operating voltage to another operating voltage while the electronic IC device is in the RUN mode 202. The transition 210 is enabled by writing a binary '1' to bit [14] of the control register 402. If an SMPS is used, the settings corresponding to the RUN mode 202 to the other RUN mode 202 in the power scheme register file 418 in the power scheme module 122 will be applied. If an external PMU is used, depending on the PMU control configuration stored in the power scheme register file 418, the sequencer state machine 124 may enable the I2C multiplexer 134 and start shifting out the PMU slave address and the RUN mode 202 to another RUN mode 202 settings in the power scheme register file 418 of the power scheme module 122. Additionally, the sequencer state machine 124 may drive the power enable output signal 138 according to an external software programmed value. A timer (TimerRR of Table V) will start to count down to zero from a pre-programmed value. During the transition 210, any external event detected by the wakeup detection circuit 120 is ignored. Once the TimerRR expires, the power sequencer module 114 disables the I2C multiplexer 134 and sends an interrupt to the external processor via the interrupt output signal 110. These steps can be followed to write to any external PMU register and/or modify the external PMU power enable pin status.

Additionally, if an SMPS is used, a quick way to change the operating voltage value is to directly write the desired voltage value to the bits [4:7] of the control register 402. Similarly, if an external PMU is used, the quicker way to modify the power enable output signal 138 is to directly modify the bits [8:9] of the control register 402.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

CONCLUSION

While various embodiments of the present invention have been described above it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above described exemplary embodiments, but should be defined only in accordance with the following claims and their equivalents.

What is claimed is:

1. A power management unit to manage low power modes for an electronic integrated circuit (IC) device, comprising:
   a sequencer state machine configured to store voltage levels for multiple power modes including a first RUN mode, a second RUN mode, a HIBERNATE mode and a POWERDOWN mode;
   a timer configured to control wait times during which an external event may trigger a transition between the first RUN mode, the HIBERNATE mode and the POWERDOWN mode;
   a control register circuit configured to store information about operating parameters of the power management unit;
   a wake up event detection logic circuit configured to trigger the transition between the multiple power modes and configured to ignore an external event if transitioning from the first RUN mode to the second RUN mode; and
   a register file circuit configured to store the settings for the first RUN mode, the HIBERNATE mode and the POWERDOWN mode.

2. The power management unit of claim 1, wherein the wake up detection logic circuit is configured to be timed by a 32 KHz clock.

3. The power management unit of claim 1, wherein the wake up detection logic circuit is configured to respond to at least 16 external wake up events.

4. The power management unit of claim 1, wherein the wake up detection logic circuit is triggered whenever a voltage level change from a High to a Low or from a Low to a High occurs.

5. The power management unit of claim 1, wherein the first RUN mode is the only operating state in which the processor runs code.

6. The power management unit of claim 1, wherein in the first RUN mode, the sequencer state machine operates in a voltage range of 0.9 Volts to 1.2 Volts.

7. The power management unit of claim 1, wherein the power management unit further includes a random access memory configured to store information about the multiple power modes.

8. The power management unit of claim 1, wherein in the POWERDOWN mode, the state machine provides zero voltage to the IC device.

9. The power management unit of claim 1, wherein the control register circuit includes programmable registers controlled by a high speed clock which can be gated off after the programmable registers have been programmed.

10. The power management unit of claim 1, wherein the control register circuit has a security key configured to prevent any malicious programming attempts.

11. The power management unit of claim 1, wherein the register file circuit is configured to store operating voltage settings for transitions between the first RUN mode, the POWERDOWN mode and the HIBERNATE mode.

12. The power management unit of claim 1, wherein the power management unit is driven by a low frequency clock operating at a frequency substantially equal to 32 KHz.

13. The power management unit of claim 1, wherein the control register circuit is configured to receive commands from an external processor.

14. The power management unit of claim 1, wherein the sequencer state machine is configured to store commands written by an external host.

15. The power management unit of claim 1, wherein the power management unit further includes an inter-integrated circuit (I2C) bus driver to drive an external power management unit via an I2C bus.

16. The power management unit of claim 1, wherein the power management unit further includes input and output lines to communicate with an external processor via an interface.

17. The power management unit of claim 9, further including an external clock manager to start and stop the high speed clock.

18. The power management unit of claim 12, further including an external clock manager to start and stop the low frequency clock.

19. The power management unit of claim 1, wherein said control register circuit includes bits configured to require a security access code to access the control register set.

20. The power management unit of claim 9, wherein the control register set is run by the high speed clock.

21. The power management unit of claim 15, wherein said power management unit supports writing to an external power management unit using said I2C bus.

22. A method to securely perform transitions between power modes of an integrated circuit (IC), comprising:
assigning a respective integrated circuit voltage level range to multiple power modes including
a first RUN mode,
a HIBERNATE mode,
a POWERDOWN mode, and
a second RUN mode operating at a voltage range different from that of the first RUN mode;
transitioning from one power mode to another power mode;
controlling wait times during which an external event may trigger a transition between the first RUN mode, the HIBERNATE mode and the POWERDOWN mode;
controlling transitions between the multiple power modes by changing a voltage applied to the IC between respective ranges of voltage levels; and
if transitioning from the first RUN mode to the second RUN mode, ignoring an external event until the transitioning is complete.

23. The method of claim 22 wherein the transitioning from the first RUN mode to the POWERDOWN mode includes the steps of:
(a) stopping a clock and a power supply;
(b) counting down to zero from a pre-programmed value;
(c) stopping counting before zero is reached, if an external event is detected;
(d) sending a request to a clock manager, if count is at zero;
(e) waiting for an acknowledgement from the clock manager;
(f) switching to a voltage level corresponding to the POWERDOWN mode, if the count is at zero; and
(g) monitoring for an external event after switching the voltage applied to the IC to said voltage level.

24. The method of claim 22, wherein the transitioning from the POWERDOWN mode to the first RUN mode includes the steps of:
(a) detecting a wake up event; and
(b) switching the voltage applied to the IC to a voltage level corresponding to the first RUN mode.

25. The method of claim 22, wherein the transitioning from the first RUN mode to the HIBERNATE mode includes the steps of:
(a) stopping a clock;
(b) counting down to zero from a pre-programmed value;
(c) stopping counting before zero is reached, if an external event is detected;
(d) sending a request to a clock manager, if count is at zero;
(e) waiting for an acknowledgement from the clock manager;
(f) switching to a voltage level corresponding to the HIBERNATE mode, if the count is at zero; and
(g) monitoring any external event after switching to said voltage level.

26. The method of claim 22, wherein the transitioning from the HIBERNATE mode to the first RUN mode includes the steps of:
(a) detecting a wake up event; and
(b) switching the voltage applied to the IC to a voltage level corresponding to the first RUN mode.

27. The method of claim 22, wherein the transitioning from the HIBERNATE mode to the POWERDOWN mode includes the steps of:
(a) counting down to zero from a pre-programmed value;
(b) switching the voltage applied to the IC to a voltage level corresponding to the POWERDOWN mode;
(c) ignoring any external event until the switching is complete; and
(d) monitoring for any external event after switching to said voltage level.

28. The method of claim 22, wherein the transitioning from the first RUN mode to the second RUN mode includes:
switching the voltage applied to the IC to a voltage level corresponding to the second RUN mode.

* * * * *